UNITED STATES PATENT OFFICE.

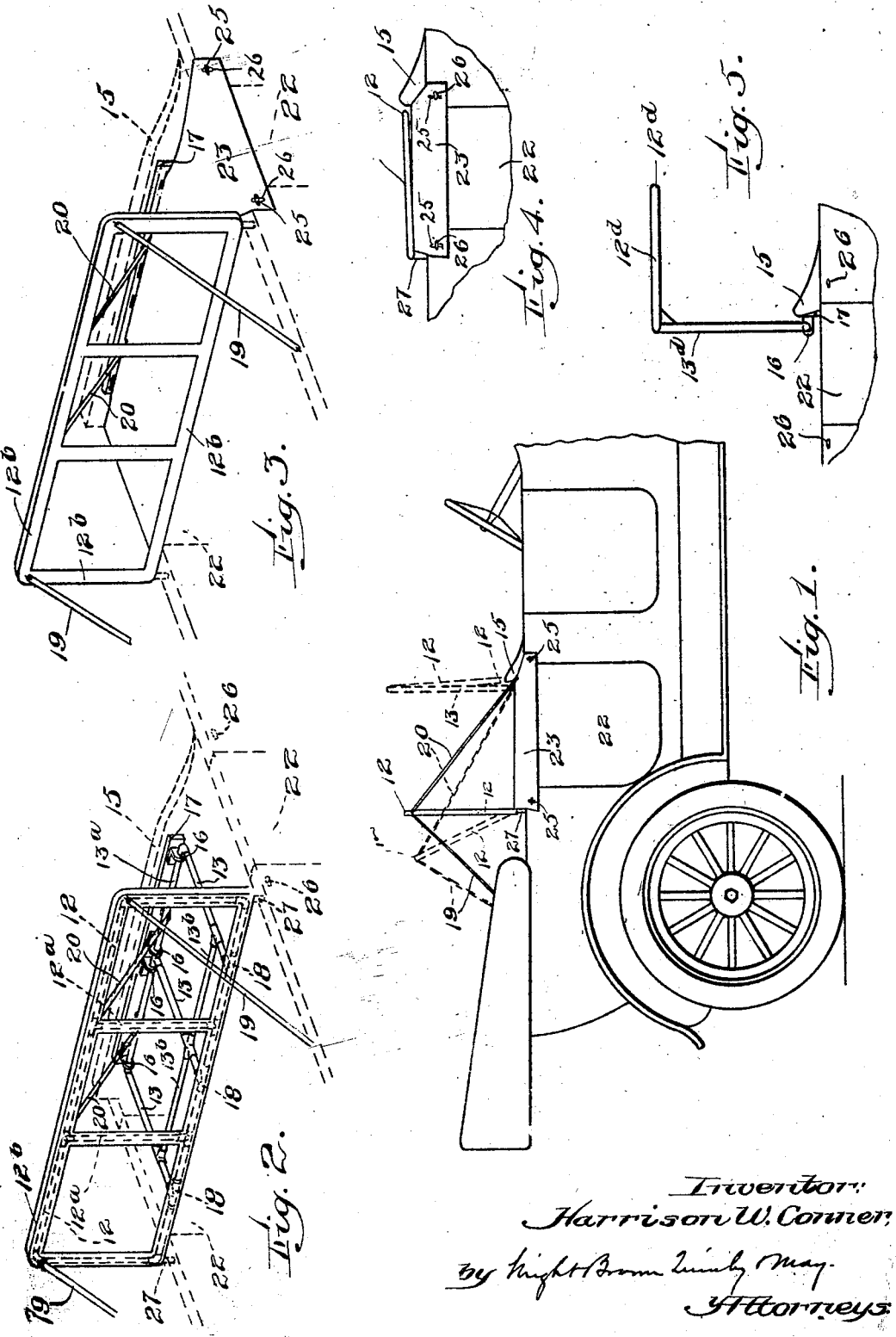

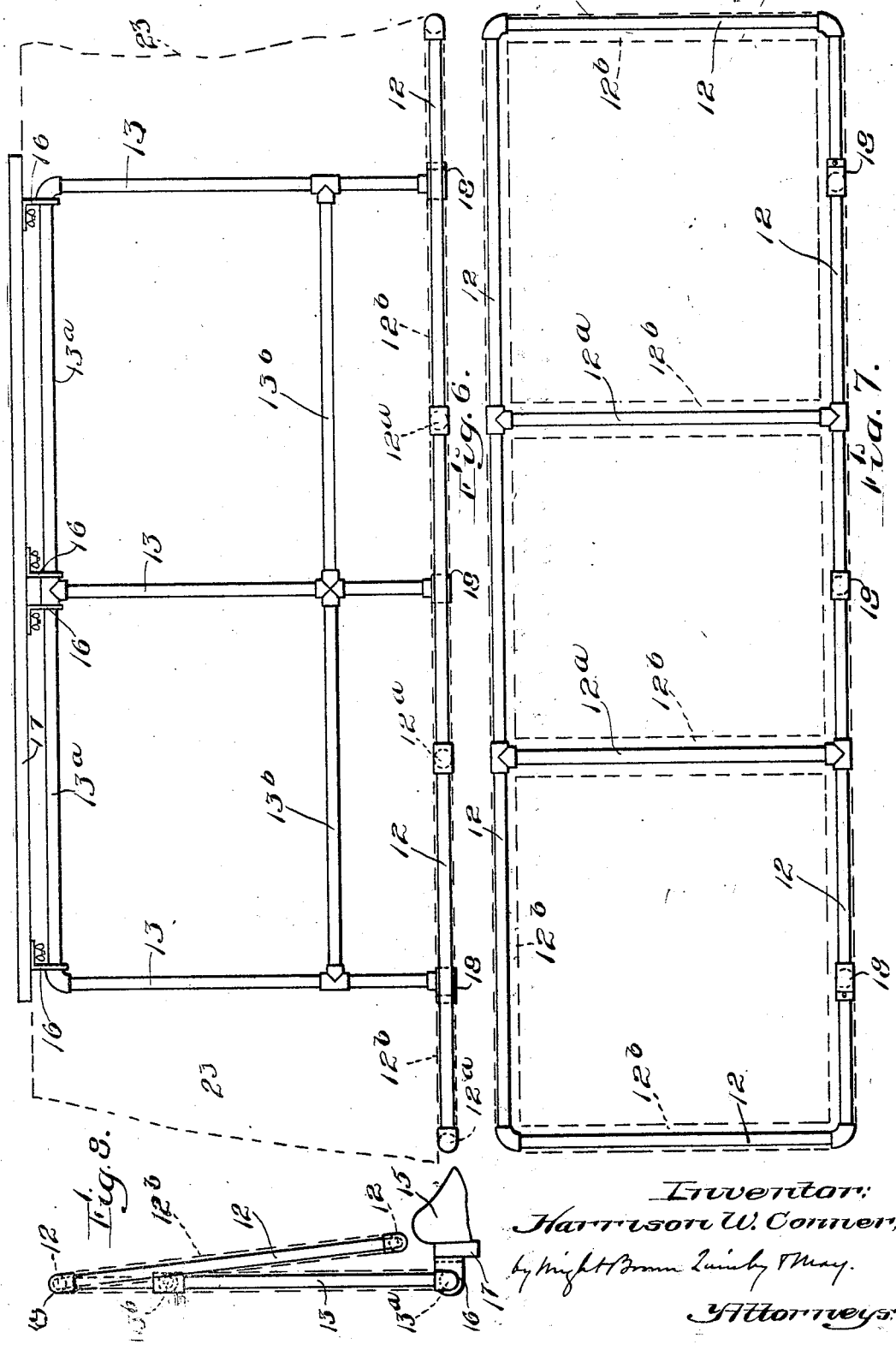

HARRISON W. CONNER, OF BOSTON, MASSACHUSETTS.

WIND-SHIELD FOR AUTOMOBILES.

1,285,626.  Specification of Letters Patent.  Patented Nov. 26, 1918.

Application filed December 12, 1917. Serial No. 206,761.

*To all whom it may concern:*

Be it known that I, HARRISON W. CONNER, a citizen of the United States, residing at Boston, in the county of Suffolk and State of Massachusetts, have invented new and useful Improvements in Wind-Shields for Automobiles, of which the following is a specification.

This invention relates to a windshield for automobile or other vehicle bodies including a screen and means for displaceably connecting the screen with the body. The invention has for its object to provide a windshield comprising a screen and confining means whereby the screen is adapted to be connected with a vehicle body in such manner that it may occupy an operative position in front of a seat thereof, the screen and confining means obstructing the passage communicating with the seat when the shield is in its operative position without obstructing the leg-receiving space in front of the seat, and being adapted to be displaced to leave said passage unobstructed for the entrance and egress of occupants of the vehicle.

The invention also has for its object to enable a portion of the windshield to support a wind-deflecting diaphragm for preventing the access of wind below the windshield to the seat, when the windshield is operatively adjusted.

The invention is embodied in the improvements which I will now proceed to describe and claim.

Of the accompanying drawings forming a part of this specification,—

Figure 1 is a side view of a portion of an automobile equipped with a windshield embodying the invention.

Fig. 2 is a perspective view showing by full lines a screen and confining means embodying the invention, and by dotted lines portions of the vehicle body.

Fig. 3 is a view similar to Fig. 2, showing the wind-deflecting diaphragm hereinafter described.

Fig. 4 is a view similar to a portion of Fig. 1, showing the screen displaced or lowered independently, the confining means, embodied in the platform hereinafter described, and the diaphragm, being in the position shown by Figs. 2 and 3.

Fig. 5 is a view similar to a portion of Fig. 1, showing a modification.

Fig. 6 is a top plan view showing the preferred construction of the screen and platform.

Fig. 7 is a rear elevation, and

Fig. 8 is an end elevation of the screen and platform shown by Fig. 7.

The same reference characters indicate the same parts in all of the figures.

The screen member or portion of the windshield may be of any suitable construction and may embody an oblong frame 12, subdivided by transverse stiles $12^a$ into a plurality of openings and suitable panes or coverings of transparent material occupying said openings, the transparent material being preferably flexible and non-frangible, such as the material known as isinglass, and secured to the frame by any suitable means such as leather strips $12^b$ attached to the frame members and panes.

The frame 12 may be advantageously constructed of metal tubing, as clearly shown by Figs. 6 and 7.

Connected with the lower portion of the screen is an inflexible platform which includes arms 13 having devices at their inner ends whereby they may be hingedly connected with a suitable fixed support, which as here shown may be the back 15 of the front seat, the wind shield being associated with the rear seat or tonneau and having a horizontal hinge connection with the back of the front seat. As here shown, said devices include a transverse rod $13^a$ connecting the inner ends of the arms 13 and constituting pintle members of a plurality of hinges, and hinge socket members 16 engaging said pintle members and adapted to be secured to the seat back 15. In practice, I prefer to attach the hinge members 16 to a cleat 17 which is suitably attached to the seat back 15. The outer ends of the arms 13 are preferably hinged to the lower edge of the screen frame 12, said arms being provided with sockets 18 forming hinge members embracing portions of the lower member of the frame 12. As clearly shown by Fig. 7, the platform including the arms 13, the transverse member $13^a$, and an outer transverse connecting member $13^b$ may be made of metal tubing.

When the screen is in its operative position, as shown by Figs. 2 and 3, and by full lines in Fig. 1, the platform extends horizontally rearward from the back of the front seat, above the leg-receiving space between the front and rear seats, so that the platform does not encroach on the usual leg-receiving space and lower portion of the screen is spaced by said platform from the front seat and held in suitable proximity to the rear seat.

As shown by Figs. 1, 2 and 3, I have provided means for detachably connecting the upper portion of the screen with suitable fixed supports to maintain the screen in a substantially upright position, said means being preferably embodied in flexible straps or guys 19 and 20. The rear guys 19 may be detachably connected with fastening members at the rear portion of the sides of the vehicle body, and the front guys 20 may be detachably connected with the front rod 13ª as shown by Fig. 2. It will, of course, be understood that the guys have suitable members at their end portions for engagement with complemental members on the screen and on the vehicle body. Said guys may be flexible straps and may be provided with suitable means for varying their length, as may be required.

The described hinge connection permits an upward and forward swinging movement of the platform, as indicated by Fig. 8, and by dotted lines in Fig. 1, to simultaneously remove the platform and the screen from the space between the front and rear seats. When this is done, the hinge connection between the screen and the platform enables the screen to stand in an inverted position, folded against the platform, so that the space or passage between the seats is left unobstructed for the entrance and egress of passengers through the usual rear door or doors 22. If desired, however, the platform may remain in its horizontal position, and the screen displaced independently and swung downward and forward, as indicated by Fig. 4, in case the occupants of the rear seat do not desire the protection afforded by the screen.

While I prefer a hinge connection between the platform and the screen, I do not limit myself thereto, and may rigidly connect the lower edge portion of the screen with the platform, as indicated by Fig. 5, in which 13ᵈ indicates the platform, and 12ᵈ the screen, these parts being shown displaced, and the screen projecting forward over the front seat. In this case the guys 19 and 20 may be omitted, if desired.

The inflexible platform is flat and has sufficient area to support a wind-deflecting diaphragm 23, which may be an oblong sheet of suitable flexible material, formed as indicated by Fig. 3, to cover the platform and overlap portions of the sides of the body, said portions including the doors 22. The diaphragm may be attached both to the bracket and the screen, in any suitable way. The end portions of the diaphragm are formed to overlap portions of the body and are provided with fastening members 25 of any suitable character adapted to engage complemental fastening members 26 on the body, so that provision is made for securely confining the ends of the diaphragm. The diaphragm is adapted to prevent wind from passing under the shield, and constitutes a horizontal guard or cover over robes or other belongings which may be left in the space between the seats when the vehicle is not occupied.

The screen may be supported against downward movement from its operative position in any suitable way. As here shown I make the screen of such length that its end portions project in opposite directions from the platform, and are adapted to bear on supports on the vehicle body. Said supports may be short studs or posts 27 attached to the sides of the vehicle body behind the doors 22, as indicated by Figs. 1, 2 and 3. It is obvious, however, that said studs may be omitted, and that the screen may bear directly on portions of the body.

When the platform and screen are simultaneously displaced, the passageway to the seat protected by the screen is unobstructed, so that passengers may freely enter and leave the vehicle. The passengers being located on the seat, the screen may be moved to its operative position and the guys 19 and 20 secured to operatively confine or brace the screen. The diaphragm is moved to and from its operative position with the screen and platform.

It will be seen that the described screen and the confining means with which it is provided, constitute a unitary structure adapted to be conveniently applied to, and removed from various types of automobile bodies, no adaptation of the body being necessary other than the attachment of the hinge members 16 to a suitable fixed part of the body, suitable fastening members being also attached to the body to engage the guys. The diaphragm may be attached to the platform and screen, so that it is inseparable therefrom and swings therewith. The end portions of the diaphragm when engaged as described with the sides of the vehicle body, prevent the platform and screen from jumping upwardly, particularly when the screen is rigidly connected with the platform as shown by Fig. 5, the guys 19 and 20 being omitted.

It is obvious that a displaceable windshield embodying the invention may be arranged to protect the occupants of a front seat, or may be adapted to a vehicle having one seat only.

When the lower edge of the screen is hinged to a support such as the platform above described, it may be inclined rearwardly from its lower edge, as shown by dotted lines in Fig. 1, and confined at the desired inclination by the adjustable guys 19 and 20. This inclination enables the screen to deflect wind upwardly and rearwardly over the heads of the passengers.

It will be seen that the diaphragm-supporting platform is provided at its inner end with a plurality of hinges including spaced apart hinge members forming parts of the platform structure, and complemental hinge members 17 attachable to a vehicle body. Said hinges constitute a horizontally extended hinge connection between the platform and body, permitting swinging movements of the platform on an elongated axis transverse to the vehicle, and preventing swinging movements in other directions, so that the platform and the screen are movable only in predetermined directions, and are free from liability to swing or be displaced in other directions, there being no liability of displacement of the screen from its predetermined operative position by wind pressure. It will also be seen that the screen is elongated to project in opposite directions from the platform and bear on opposite side portions of the body, so that the platform, and a diaphragm 23 supported thereby, may be maintained by the screen in a substantially horizontal position over the leg-receiving space in front of a seat. When the screen is hinged to the platform, as shown by all the figures, excepting Fig. 5, the hinge members connecting the screen to the outer end of the platform constitute outer hinges, the hinge members connecting the platform to the vehicle body constituting inner hinges, each set of hinges constituting an elongated hinge connection which is transverse to the body.

I claim:

1. A windshield comprising a platform adapted to support a wind-deflecting diaphragm and provided at one end with a plurality of spaced apart hinge members and with complemental hinge members attachable to a portion of a vehicle body in front of a seat thereof, the hinges formed by said members permitting the platform to swing on an axis transverse to the vehicle and preventing movements of the platform in other directions, and a screen connected with the outer end of the platform, means being provided for confining the screen at an angle with the platform, the screen being elongated to project in opposite directions from the platform and bear on opposite side portions of the vehicle body, to operatively support the windshield, as a whole, with the platform in a horizontal position over the leg-receiving space in front of said seat, and the screen upstanding from the outer end of the platform.

2. A windshield comprising a platform adapted to support a wind-deflecting diaphragm and provided at one end with a plurality of spaced apart hinge members and with complemental hinge members attachable to a portion of a vehicle body in front of a seat thereof, the hinges formed by said members permitting the platform to swing on an axis transverse to the vehicle and preventing movements of the platform in other directions, the outer end of the platform being provided with a plurality of spaced apart outer hinge members, and a screen provided with complemental outer hinge members jointed to the outer hinge members of the platform, said members forming outer hinges permitting swinging movements of the screen relatively to the platform on an axis transverse to the vehicle and preventing other swinging movements of the screen relatively to the platform, means being provided for confining the screen at an angle to the platform, the screen being elongated to project in opposite directions from the platform and bear on opposite side portions of the vehicle body to operatively support the windshield, as a whole, with the platform in a horizontal position over the leg-receiving space in front of said seat and the screen upstanding from the outer end of the platform.

3. A windshield comprising a platform adapted to support a wind-deflecting diaphragm and including a rod which forms not only the inner end of the platform, but also a plurality of spaced apart hinge pintle members, said platform having spaced apart hinge socket members at its outer end, hinge socket members jointed to the pintle-forming portions of said rod, and attachable to a portion of a vehicle body in front of a seat thereof, and a screen one edge of which includes spaced apart hinge pintle-members jointed to the hinge socket members on the outer end of the platform, means being provided for confining the screen at an angle with the platform, the screen being elongated to project in opposite directions from the platform and bear on opposite side portions of the vehicle body to operatively support the windshield, as a whole, with the platform in a horizontal position over the leg-receiving space in front of said seat and the screen upstanding from the outer end of the platform.

In testimony whereof I have affixed my signature.

HARRISON W. CONNER.